United States Patent
Mohan et al.

(10) Patent No.: US 9,503,621 B2
(45) Date of Patent: Nov. 22, 2016

(54) PENDANT HOUSING FOR A CAMERA

(71) Applicant: Avigilon Corporation, Vancouver (CA)

(72) Inventors: Sudeep Mohan, Vancouver (CA); Andrew J. Stark, Vancouver (CA)

(73) Assignee: AVIGILON CORPORATION, Vancouver (CA)

( * ) Notice: Subject to any disclaimer, the term of this patent is extended or adjusted under 35 U.S.C. 154(b) by 0 days.

(21) Appl. No.: 14/865,421

(22) Filed: Sep. 25, 2015

(65) Prior Publication Data
US 2016/0065804 A1   Mar. 3, 2016

Related U.S. Application Data

(63) Continuation of application No. 14/511,113, filed on Oct. 9, 2014, now Pat. No. 9,172,855, which is a continuation-in-part of application No. 29/500,843, filed on Aug. 28, 2014, now Pat. No. Des. 744,571.

(51) Int. Cl.
| | |
|---|---|
| *H04N 5/225* | (2006.01) |
| *H04N 9/04* | (2006.01) |
| *G03B 17/08* | (2006.01) |
| *G08B 13/196* | (2006.01) |

(52) U.S. Cl.
CPC ............ *H04N 5/2252* (2013.01); *G03B 17/08* (2013.01); *G08B 13/19619* (2013.01)

(58) Field of Classification Search
CPC .................. G08B 13/19619; G08B 13/19632; G08B 15/001; G03B 17/08; H04N 5/2252
See application file for complete search history.

(56) References Cited

U.S. PATENT DOCUMENTS

| | | |
|---|---|---|
| 3,732,368 A | 5/1973 | Mahlab |
| 4,320,949 A | 3/1982 | Pagano |
| 5,181,120 A | 1/1993 | Hickey et al. |
| 5,394,209 A | 2/1995 | Stiepel et al. |
| 5,418,567 A | 5/1995 | Boers et al. |
| 5,649,255 A | 7/1997 | Scheiltz |
| D414,504 S | 9/1999 | Madden |
| D424,087 S | 5/2000 | Frick et al. |
| 6,061,087 A | 5/2000 | Schieltz et al. |
| 6,268,882 B1 * | 7/2001 | Elberbaum ...... G08B 13/19619 348/143 |
| 6,322,258 B1 | 11/2001 | Ryan et al. |
| 6,354,749 B1 | 3/2002 | Pfaffenberger, II |
| D457,904 S | 5/2002 | Toste et al. |
| D461,485 S | 8/2002 | Jones et al. |
| 6,476,856 B1 | 11/2002 | Zantos |
| D473,887 S | 4/2003 | Jones et al. |
| 6,678,001 B1 | 1/2004 | Elberbaum |
| D503,183 S | 3/2005 | Arbuckle |

(Continued)

OTHER PUBLICATIONS

Axis Communications; "AXIS 216FD Pendant Kit: Installation Guide;" Ver. 1.1; Jul. 2011; 34 pp.

(Continued)

*Primary Examiner* — Trung Diep
(74) *Attorney, Agent, or Firm* — Baker & Hostetler LLP

(57) ABSTRACT

A pendant housing for a camera. The housing comprises a substantially cylindrical casing. The substantially cylindrical casing further includes a top end portion that may be removeably mounted to a tube without a tool, a dome structure that may house at least a lens portion of a camera, a bottom end portion that may be removeably mounted to the dome structure without a tool, and a waterproof seal positioned between the bottom end portion and the dome structure.

19 Claims, 17 Drawing Sheets

(56) References Cited

U.S. PATENT DOCUMENTS

| | | | |
|---|---|---|---|
| D552,651 S | 10/2007 | Arbuckle | |
| D561,808 S | 2/2008 | Arnold et al. | |
| D568,361 S | 5/2008 | Arnold et al. | |
| 7,379,119 B1 | 5/2008 | Schuetz | |
| D576,195 S | 9/2008 | Grotto | |
| 7,495,703 B2 * | 2/2009 | Arbuckle | G08B 13/19619 285/420 |
| D610,183 S | 2/2010 | Nohavec et al. | |
| D615,115 S | 5/2010 | Arnold | |
| 8,148,634 B1 | 4/2012 | Gretz | |
| D662,120 S | 6/2012 | Deurwaarder | |
| D667,860 S | 9/2012 | Lee et al. | |
| 8,317,414 B2 | 11/2012 | Jones | |
| D702,275 S | 4/2014 | Ying | |
| D719,208 S | 12/2014 | Mohan | |
| 9,172,855 B1 | 10/2015 | Mohan et al. | |
| 2005/0007488 A1 | 1/2005 | Arbuckle et al. | |
| 2007/0126872 A1 | 6/2007 | Bolotine et al. | |
| 2009/0162048 A1 * | 6/2009 | Tatewaki | G03B 17/02 396/427 |
| 2009/0290023 A1 | 11/2009 | Lefort et al. | |
| 2010/0128446 A1 | 5/2010 | Dipoala | |
| 2012/0113245 A1 | 5/2012 | Blanchard | |
| 2014/0037282 A1 * | 2/2014 | Chen | G03B 17/08 396/427 |
| 2014/0037283 A1 | 2/2014 | Cury | |

OTHER PUBLICATIONS

Axis Communications; "AXIS T94B01D Pendant Kit for AXIS M3004-V/M3005-V Network Camera: Installation Guide;" Ver. 1.0; May 2013; 8 pp.

Axis Communications; "AXIS T94F01D Pendant Kit for AXIS M3006-V/M3007-PV Network Camera: Installation Guide;" Ver. 1.0; Mar. 2013; 6 pp.

Bosch Security Systems, Inc.; "AUTODOME 7000 HD Data Sheet;" V9; Oct. 2013; 10 pp.

Bosch Security Systems, Inc.; "AutoDome Junior HD VJR Series: Installation Manual;" V6.0; Nov. 2012; 194 pp.

Bosch Security Systems, Inc.; "Indoor Minidome Wall and Pipe Mounts VDA-WMT/PMT-AIDome: Installation Manual;" v1.0; Aug. 2012; 10pp.

Bosch Security Systems, Inc.; "Outdoor Minidome Wall and Pipe Mounts VDA-WMT/PMT-AODome: Installation Manual;" v1.0; Aug. 2012; 10 pp.

International Application No. PCT/US2014/060151; Written Opinion of the Int'l Searching Authority; dated Jan. 26, 2015; 6 pages.

International Patent Application No. PCT/US2014/060151; Int'l Preliminary Report on Patentability; dated Aug. 11, 2016; 7 pages.

International Patent Application No. PCT/US2014/060151; Int'l Preliminary Report on Patentability; dated Sep. 1, 2016; 28 pages.

* cited by examiner

PENDANT HOUSING FOR A CAMERA

CROSS REFERENCE TO RELATED APPLICATIONS

This application is a continuation of U.S. patent application Ser. No. 14/511,113 filed Oct. 9, 2014, entitled PENDANT HOUSING FOR A CAMERA. U.S. patent application Ser. No. 14/511,113 is a continuation in-part of U.S. Design patent application No. 29/500,843 filed on Aug. 28, 2014, entitled PENDANT ENCLOSURE FOR SPHERICAL CAMERA, the contents of each of which are incorporated herein by reference in their entirety.

TECHNICAL FIELD

The present disclosure is directed at a pendant housing for a camera such as a security camera.

BACKGROUND

There is an increasing demand for video surveillance equipment globally to address actual and perceived needs for surveillance of buildings, warehouses, garages and other public and private spaces in order to prevent and respond to violent crime, property crime, and terrorism. In particular, a significant amount of activity in the global surveillance market relates to replacing analog security cameras with newer and more flexible digital surveillance cameras and to adding cameras in physical spaces where it was difficult to place cameras in the past. Given this, there exists a continued need for solutions that can expedite and ease installation of video surveillance equipment generally and security cameras in particular.

SUMMARY

According to a first aspect, there is provided a pendant housing for a camera. The housing comprises a substantially cylindrical casing. The substantially cylindrical casing further includes a top end portion that may be removeably mounted to a tube or rod without a tool, a dome structure that may house at least a lens portion of a camera, a bottom end portion that may be removeably mounted to the dome structure without a tool, and a waterproof seal positioned between the bottom end portion and the dome structure.

The substantially cylindrical casing may be mounted to any type of cylindrical base, such as a threaded tube, a threaded pipe, or a threaded metal rod.

The top end portion of the substantially cylindrical casing may be extended upward and threaded. The bottom end portion of the substantially cylindrical casing may be extended downward and threaded. The dome structure may also be threaded.

The housing may further comprise an adapter removeably mounted to the top end portion. The adapter may be threaded. The housing may also further comprise a waterproof ring positioned between the top end portion of the substantially cylindrical casing and the adapter after the top end portion is mounted.

The dome structure of the housing may further comprise a cylindrical dome housing, a substantially clear dome, a compressible seal that may be positioned between the cylindrical dome housing and the substantially clear dome, and a dome ring that may be affixed to the substantially clear dome and the cylindrical dome housing without a tool. The substantially clear dome and the cylindrical dome housing may be detachable to one another.

The dome ring may also further comprise at least one spring. The at least one spring may maintain the affixation between the substantially clear dome and the cylindrical dome housing. The at least one spring may further have the capability to absorb external pressure when pressed against the substantially clear dome.

The bottom end portion of the substantially cylindrical casing may further include an interior side wall that forms at least one hole. The at least one hole of the interior side wall may be configured to couple with a detachable sliding member. The detachable sliding member may be configured to hold the camera.

The detachable sliding member may be further capable of sliding along the interior side wall of the bottom end portion. The detachable sliding member may also further be attached to a gimbal.

The detachable sliding member may further include at least one latch that extends from an underside of the detachable sliding member. Each of the one or more latches may further have a lever arm at an end of which is a hook. The latches may be configured to hook over and secure the gimbal.

The gimbal may further include a security camera head. The gimbal may include at least two arms positioned frictionally to hold the security camera in place. The arms may extend linearly and positioned to contact the security camera head. Further, the gimbal may include a seat positioned to receive a surface of the security camera head. The seat may be curved.

The security camera head may further include at least one lens, at least one image sensor, an image processing module, and a cable. The security camera head may be spherical in shape.

The gimbal may further comprise a top surface from which the arms and the seat extend. The top surface of the gimbal comprising a slot for receiving a cable that connects the security camera head to image processing circuitry.

The gimbal may further comprise a lip extending from the top surface on a side opposite from which the arms and the seat extend. The lip may be spaced from the periphery of the top surface to delineate a flange between the lip and the periphery of the top surface.

According to another aspect, there is provided a method for housing a camera. The method comprises, mounting a substantially cylindrical casing with a top end portion to a tube without a tool, mounting a dome structure with at least one lens portion of a camera to a bottom end portion of the substantially cylindrical casing without a tool, and positioning a waterproof seal between the bottom end portion and the dome structure.

The substantially cylindrical casing may be mounted to a threaded tube, a threaded pipe, or a threaded metal rod.

The top end portion of the substantially cylindrical casing may be extended upward and threaded. The bottom end portion of the substantially cylindrical casing may be extended downward and threaded. The dome structure may be threaded.

The housing may further comprise an adapter removeably mounted to the top end portion. The adapter may be threaded. The housing may also further comprise a waterproof ring positioned between the top end portion of the substantially cylindrical casing and the adapter after the top end portion is mounted.

The dome structure of the housing may further comprise a cylindrical dome housing, a substantially clear dome, a compressible seal that may be positioned between the cylindrical dome housing and the substantially clear dome, and a dome ring that may be affixed to the substantially clear dome and the cylindrical dome housing without a tool. The substantially clear dome and the cylindrical dome housing may be detachable to one another.

The dome ring may also further comprise at least one retaining ring. The at least one retaining ring may maintain the affixation between the substantially clear dome and the cylindrical dome housing. The at least one spring may further have the capability to absorb external pressure when pressed against the substantially clear dome.

BRIEF DESCRIPTION OF THE DRAWINGS

In the accompanying drawings, which illustrate one or more example embodiments.

DETAILED DESCRIPTION OF ILLUSTRATIVE EMBODIMENTS

Figure 1:
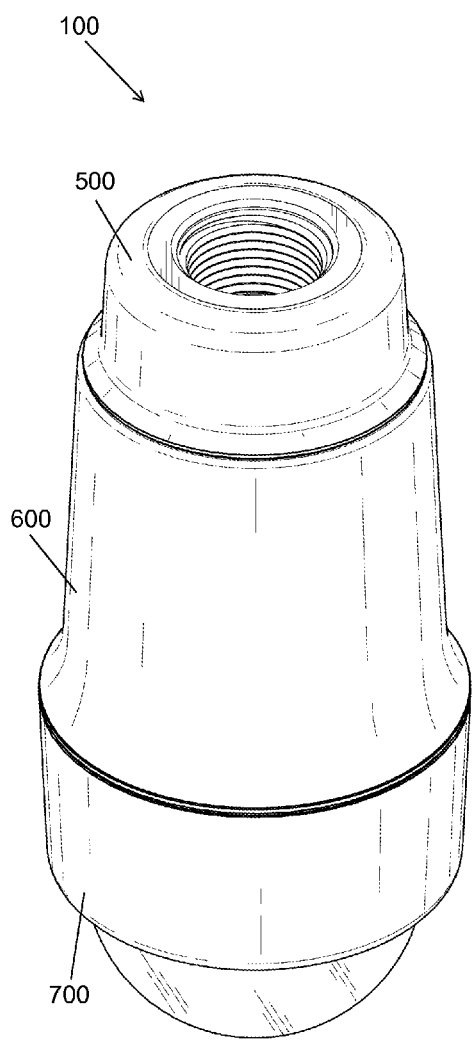
FIG. 1 is a perspective view of a pendant housing for a camera, according to one embodiment.

Directional terms such as "top," "bottom," "upwards," "downwards," "vertically," and "laterally," are used in the following description for the purpose of providing relative reference only, and are not intended to suggest any limitations on how any article is to be positioned during use, or to be mounted in an assembly or relative to an environment. Additionally, the term "substantially" as used in this description is intended to describe a particular characteristic of a claimed element. Further, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

A mounting housing refers to a housing that can be used to mount a device to a surface, such as a wall or ceiling. For example, a mounting housing may be combined with a camera to make an in-ceiling mount camera, which is a camera that is designed to be mounted to and partially recessed behind a ceiling. A suitable ceiling is one in which a hollow cavity is behind the ceiling and is sufficiently large to accept back ends of the camera and the mounting housing, which are hidden from view when the camera is mounted, and any associated wiring; suitable ceilings may comprise, for example, drywall screwed on to joists and a suspended or "dropped" ceiling. In the case of a dome camera for example, the bulk of the camera is recessed behind the ceiling and only the hemispherical dome is visible below the ceiling. The portion of the camera that is above the bottom surface of the ceiling when the camera is mounted is the "back end" of the camera, while the volume of space above the bottom surface of the ceiling is the "ceiling space". A hole is cut in the ceiling that is slightly larger than required to allow the back end of the camera to be inserted through it. The camera is equipped with a mechanism to grip the ceiling and hold the camera securely in place.

Generally, these gripping mechanisms are difficult to operate because they are hidden from an installer's view behind the ceiling. They typically use a leadscrew-driven clamp that the installer screws to clamp the camera to the ceiling in order to accommodate a wide range of ceiling thicknesses. Consequently, for thin ceilings the installer may have to awkwardly screw the clamp for a long period of time. This is cumbersome and time consuming for the installer, particularly since the installer is usually standing on a ladder while using one hand to support the camera while screwing the leadscrew. In addition, factories or building space with high ceilings create a difficult task not only for the installation process of a dome camera but also for users who want to capture images on the ground with more precision. In a large warehouse type of building with 15 foot or higher ceilings, mounting a camera on the ceiling will only generate images of the tops of people's bodies or the tops of objects on the ground, which may make accurate surveillance difficult.

Figure 11A:
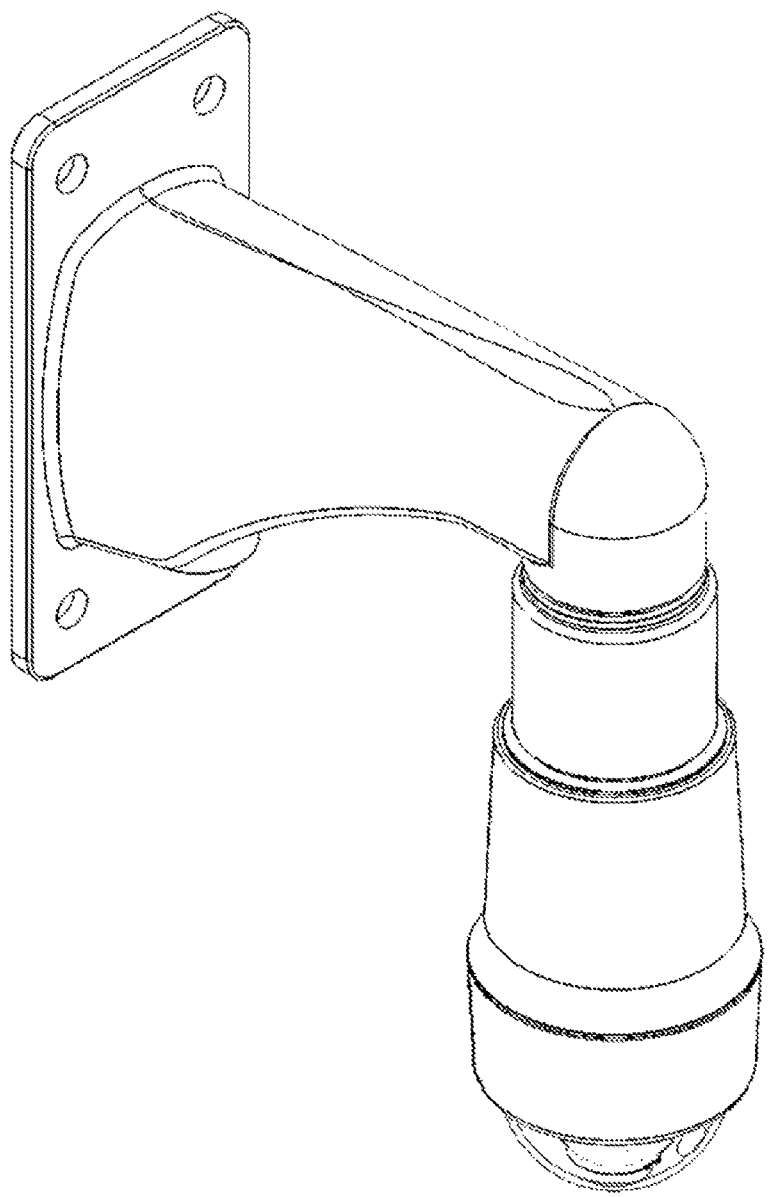
FIGS. 11A and 11B show perspective views of embodiments for mounting the pendant housing for a camera to a wall and to a pipe extending from a ceiling.
Figure 11B:
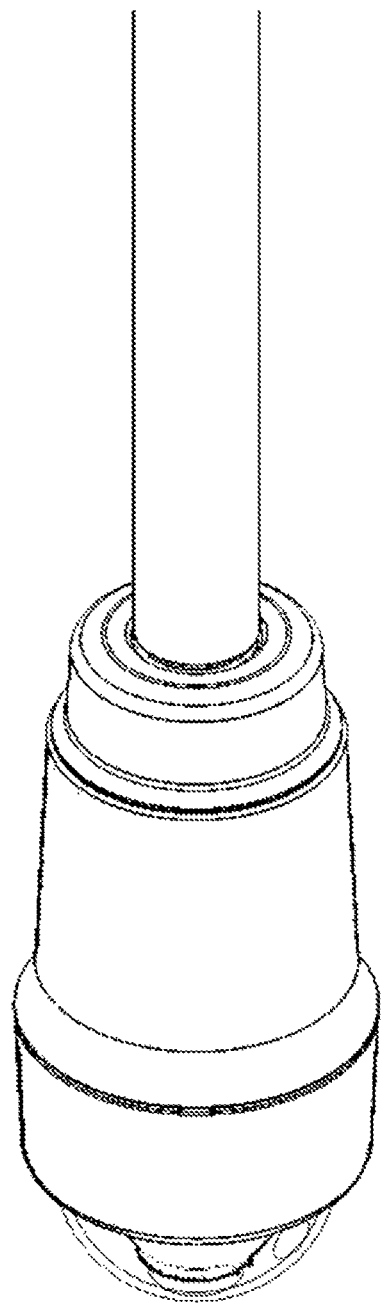

In contrast, the depicted embodiments are directed at a pendant housing for a camera such as a security camera that may be mounted to a tube, such as a pipe, suspending down from a ceiling, such as shown in FIG. 11B, and a method for housing and mounting the camera to the tube. The pendant housing may also be mounted to a pendant arm and may in turn be mounted to a wall or other vertical surface, such as shown in FIG. 11A. The camera housing may comprise a substantially cylindrical casing including a top end portion that may be mountable to a tube, without a tool, through an adapter. A tube is merely one embodiment that the casing may mount to and the present disclosure is not limited to just tubes or similarly cylindrically shaped objects. A pipe, an elongated cylindrical plastic tube, a polyvinyl chloride (PVC) pipe, a pendant arm, or a metal rod are some examples of alternative embodiments in which the casing may mount to, although hollow tubes have the advantage of retaining wiring for the camera that might be exposed by a rod mount. The casing has a bottom end portion capable of being mounted to a dome structure without a tool. The bottom end portion of the casing may include a security camera that may hook onto the interior wall of the casing without a tool. The security camera may be positioned on a sliding member and a gimbal. The sliding member may provide for the security camera to slide along the interior of the casing and to hook onto the casing.

As noted above and further described below, the entire housing and camera, the camera system, may be assembled by an installer without the need for a tool. The dome may be installed in the dome housing, with a seal between the dome and the dome housing, by placing the dome in the dome housing with the seal in place and pushing a spring into the housing to flexibly secure the dome. The camera may then be snapped into the gimbal, with wiring for the camera secured from damage by other pieces that snap into place. The housing itself may be screwed onto the threaded tube lowered from the ceiling, and the dome housing may then be screwed onto the other end of the housing. In this manner, the installer is not required to carry a tool belt while climbing a ladder or to maintain their balance on the ladder while attempting to use various tools to accomplish an installation of the camera system. This reduces the amount of time required to install the camera, reduces the potential for injury and generally lowers the cost of replacing or installing cameras. As discussed in greater detail below, and in the example embodiment in which is the casing is mounted to a tube suspended down from the ceiling, the casing may also be mounted in other ways.

As also noted, a waterproof seal may be conveniently positioned between the bottom end portion and the dome structure to provide protection from water damage to the camera and a seal may be placed between the housing and any adapter used to install the housing onto difference sized tubes or pipes. The combination of seals between the adapter and housing, and housing and the dome structure and the dome and the dome housing are unique for a camera used in interior applications. Normally, only exterior cameras are sealed to prevent rain, snow and other humidity from entering the camera housing and fogging up the inside of the dome or damaging the camera. Even when cameras are installed inside buildings with sprinkler-based fire protection systems, the cameras are mounted in the ceilings above the sprinklers, so are in no danger of getting wet in the event the sprinklers are activated. However, when the sprinklers are mounted above the cameras, such as when the camera is mounted to pipe dropped from the ceiling, the camera is completely exposed to water in the event the sprinklers are activated, which thereby necessitates the seals described herein.

The embodiments depicted in the drawings are discussed below. These embodiments are primarily directed to an embodiment that includes mounting the housing to a tube. However, as discussed above, in alternative embodiments (not depicted) the mounting products may be another product, such as a metal rod or differently shaped structure.

Figure 2:
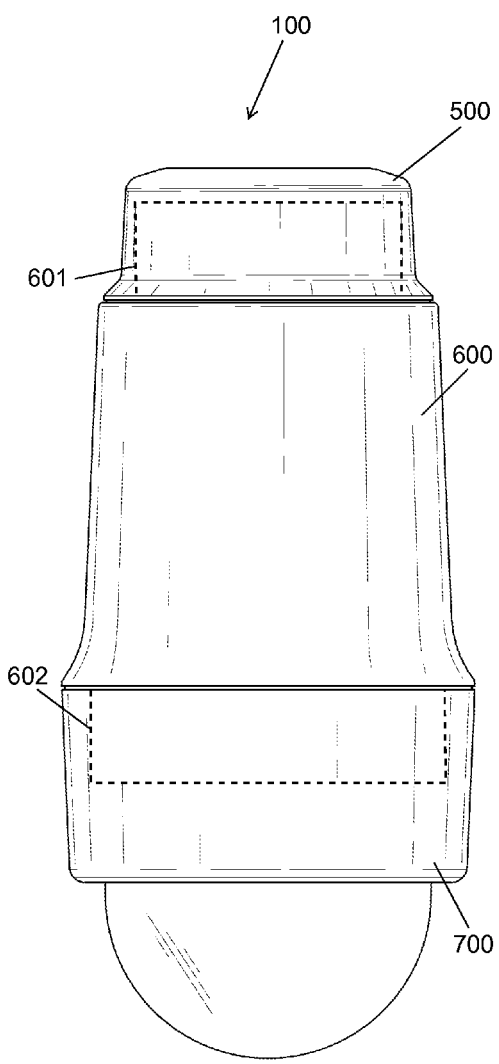
FIG. 2 shows a perspective side view of the housing for a camera of FIG. 1, according to one embodiment.

Referring now to FIGS. 1 and 2, there are respectively shown a perspective and a side view of a housing 100 in isolation. The housing 100 generally comprises a substantially cylindrical casing 600. The substantially cylindrical casing 600 including a top end portion 601 (shown as dashed lines) that may be removeably mounted to a tube (not pictured) through an adapter 500 (shown in more detail in FIG. 5). The adapter 500 may be threaded and may vary in height. The substantially cylindrical casing 600 including a bottom end portion 602 (shown as dashed lines) that may be removeably mounted to a dome structure 700 (shown in more detail in FIGS. 7A, 7B and 7C). The above mountings mentioned may all be accomplished without a tool. The diameter of the exposed portion of the cylindrical casing 600 may generally increase from near the top end portion 601 to near the bottom end portion 602, which serves to provide a wider flange near the bottom end portion 602 and enables a seal to be mounted between near the bottom end portion 602 and the dome structure 700, as further described below.

Figure 3:
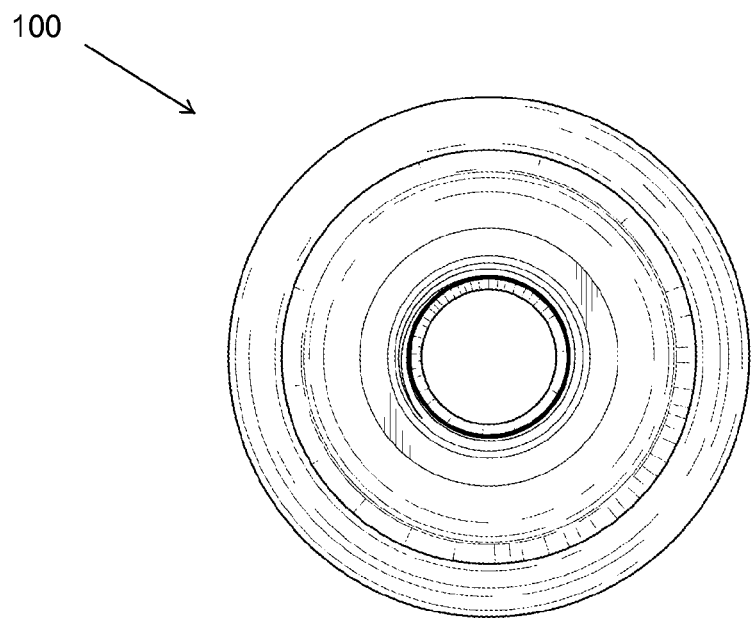
FIGS. 3 and 4 show a top plan and a bottom plan view, respectively, of the housing of FIGS. 1 and 2.
Figure 4:
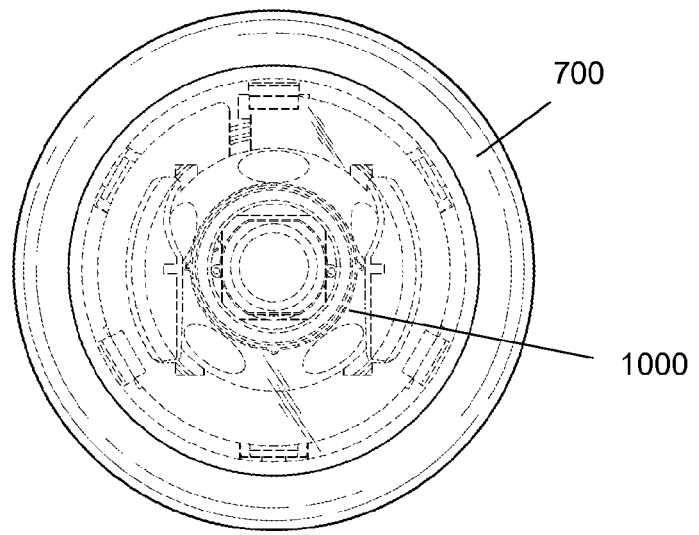

Referring now to FIGS. 3 and 4, there are respectively shown top plan and bottom plan views of housing 100 in isolation. In FIG. 3, the top plan view of housing 100 may be comprised of the adapter 500 forming an opening. The opening of adapter 500 may be mounted to a tube (not pictured). The tube may be threaded. In FIG. 4, the bottom plan view of housing 100 may be comprised of the dome structure 700 (shown in more detail in FIG. 7). The dome structure 700 may be comprised to hold a security camera 1000 (shown in more detail in FIG. 10).

Figure 5A:
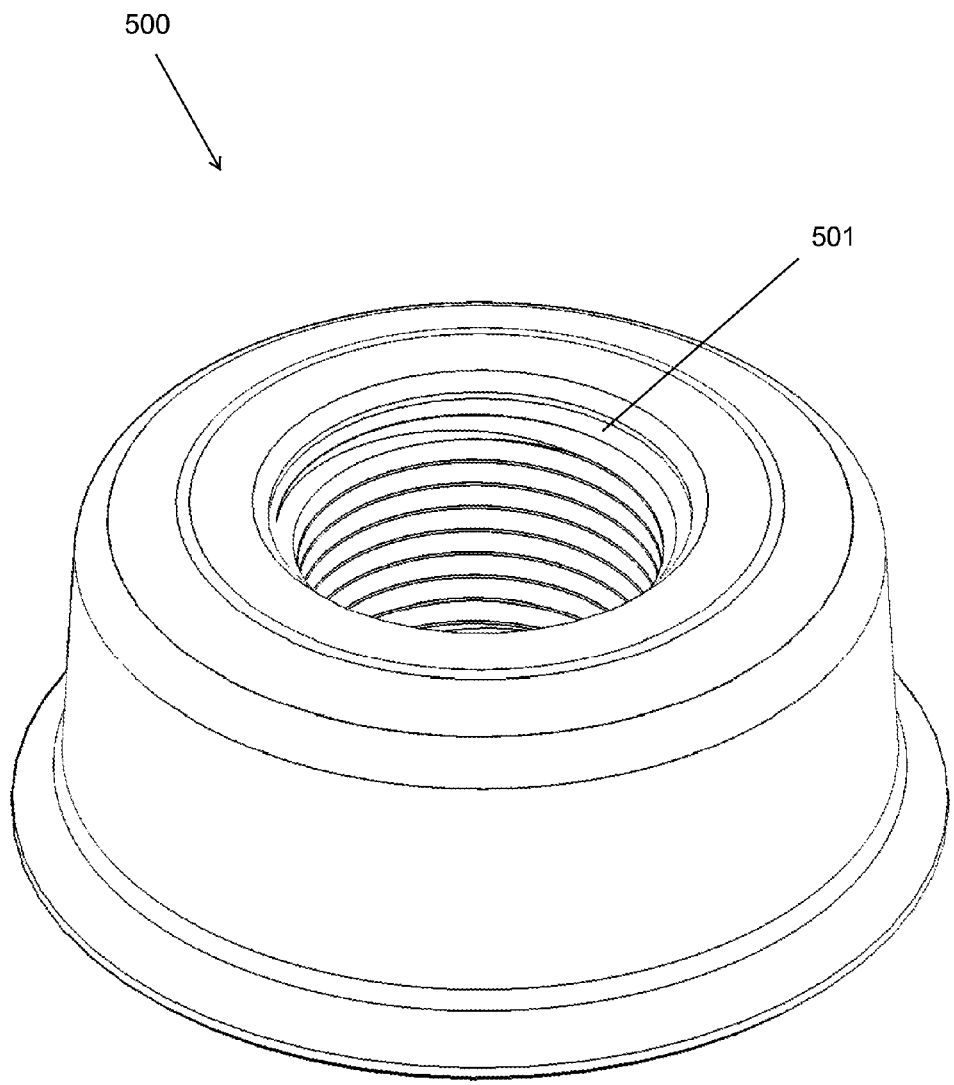
FIGS. 5A, 5B and 5C show perspective, top plan, and bottom plan views, respectively, of an adapter that comprises part of the housing in FIGS. 1 and 2.
Figure 5B:
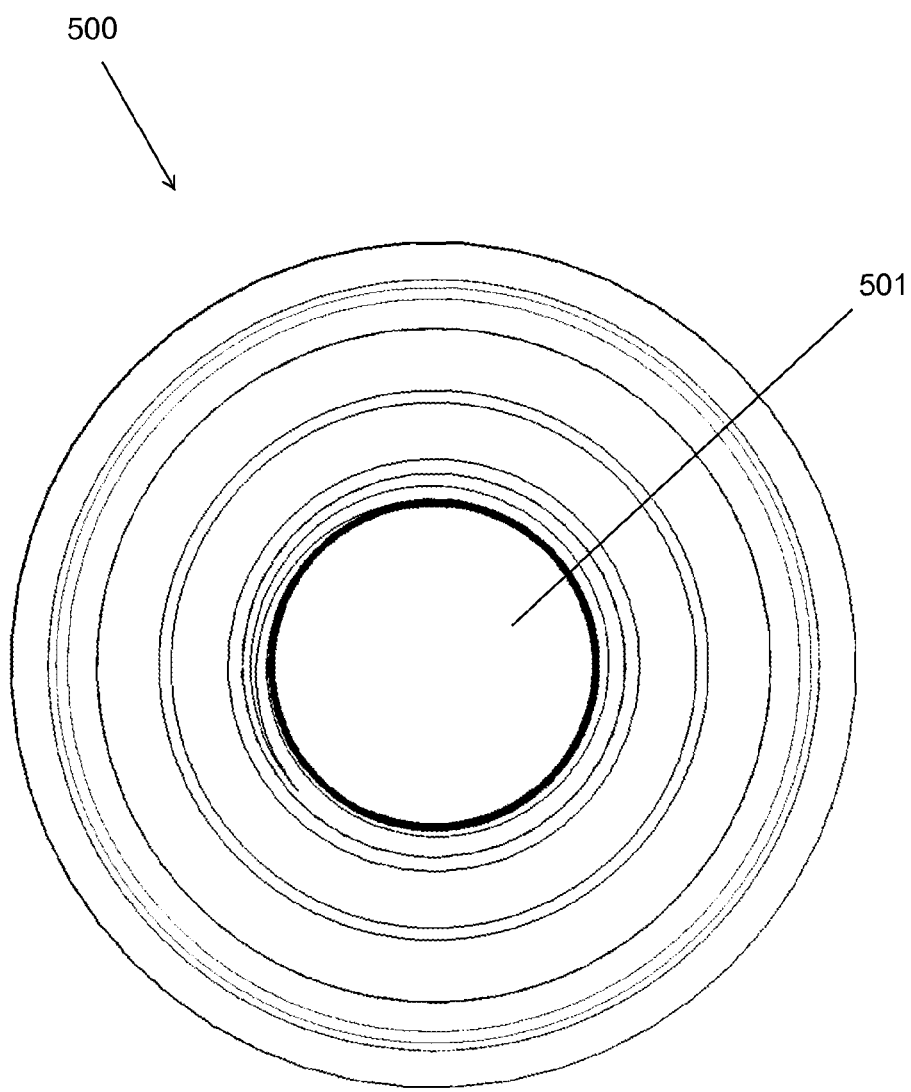
Figure 5C:
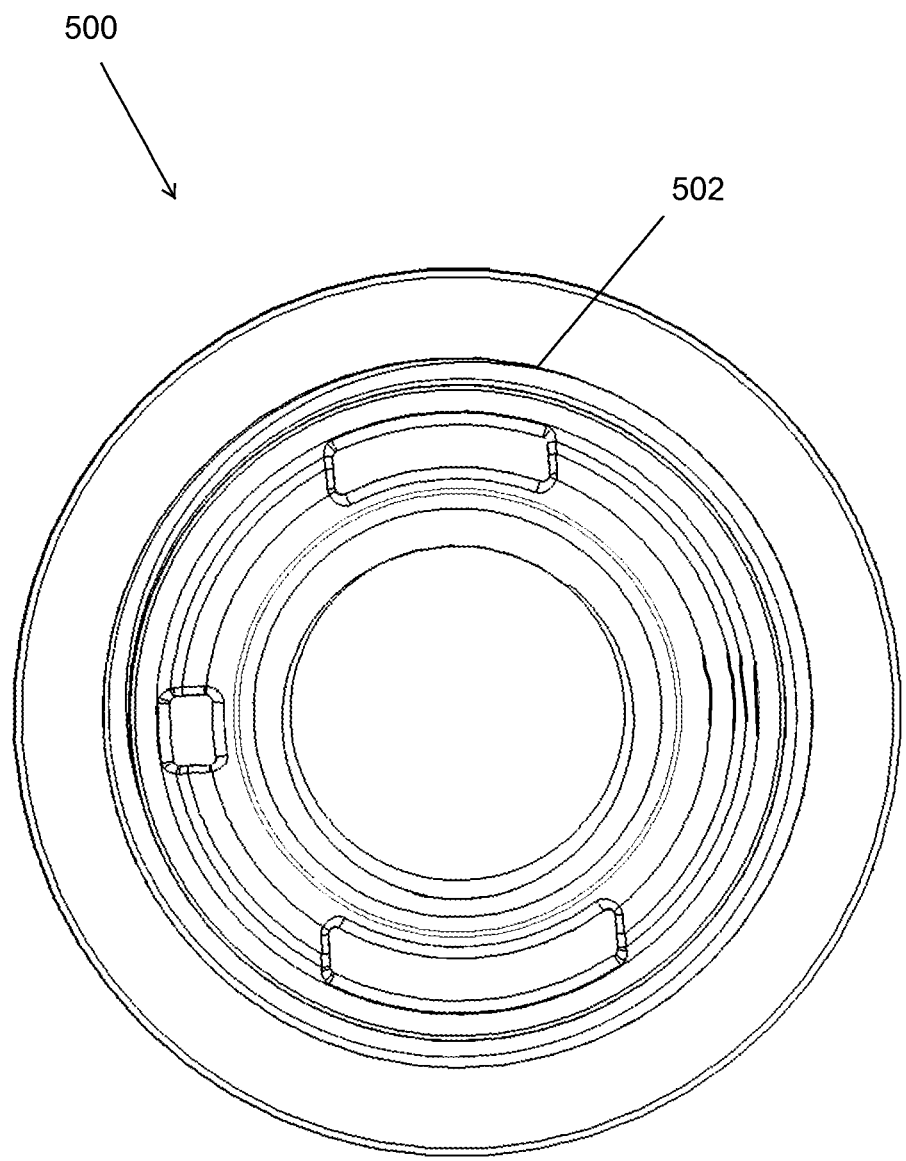

Referring now to FIGS. 5A, 5B and 5C, there are respectively shown perspective, top plan, and bottom plan views of the adapter 500. In FIG. 5A, the adapter 500 may include a first interior side wall 501, that may be threaded, and that forms the opening for mounting to the tube. A second interior wall 502 of the adapter 500 may be threaded for coupling and removeably mounting to the threaded top end portion 601 of the casing 600 (shown in more detail in FIG. 6) without a tool. The adapter 500 and the top end portion 601 of the casing 600 may be threaded together simply by twisting and turning the adapter 500 in a certain direction onto the top end portion 601 of the casing 600.

Figure 6A:
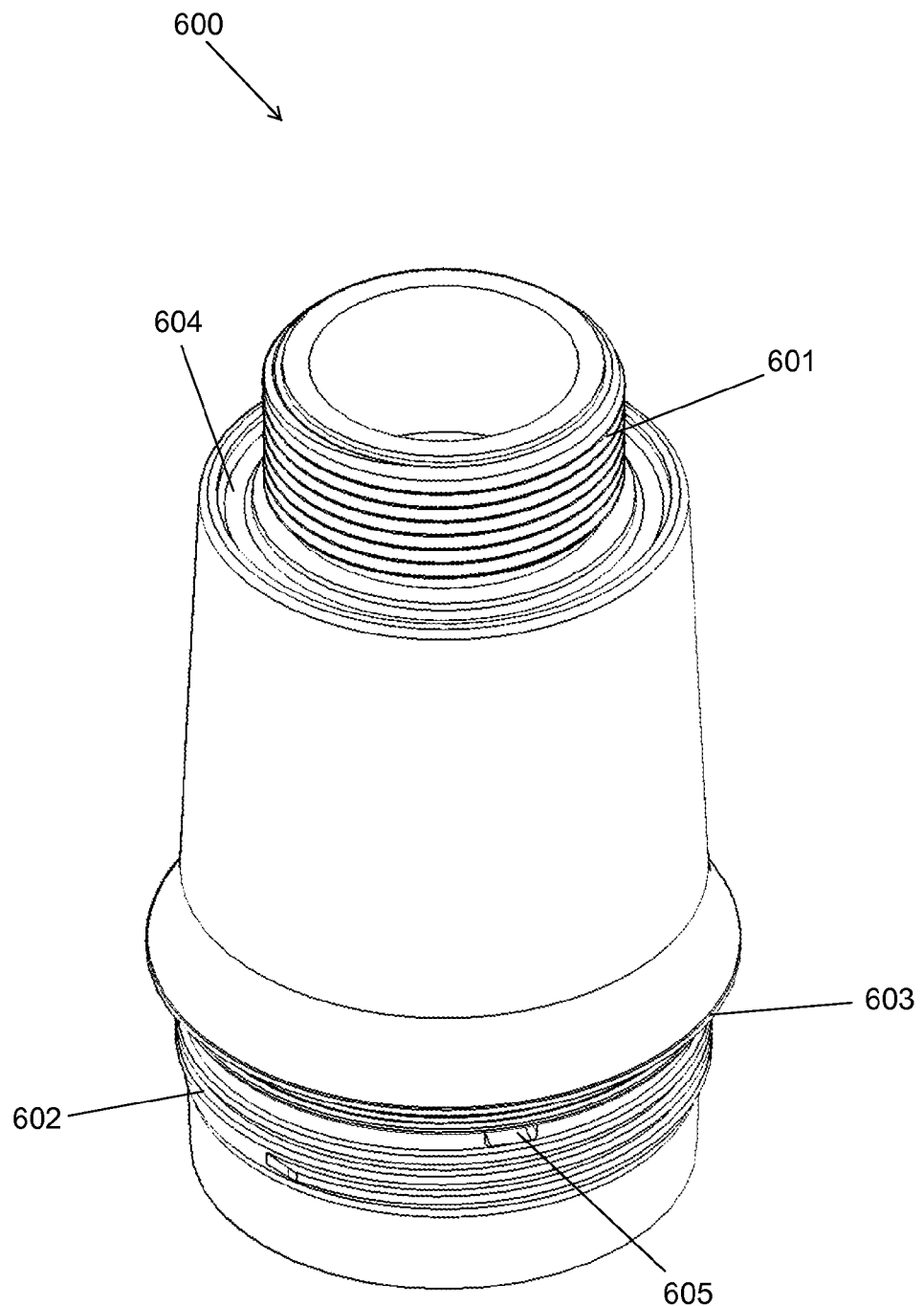
FIGS. 6A and 6B show perspective and front views of the housing without the adapter and dome structure attached.
Figure 6B:
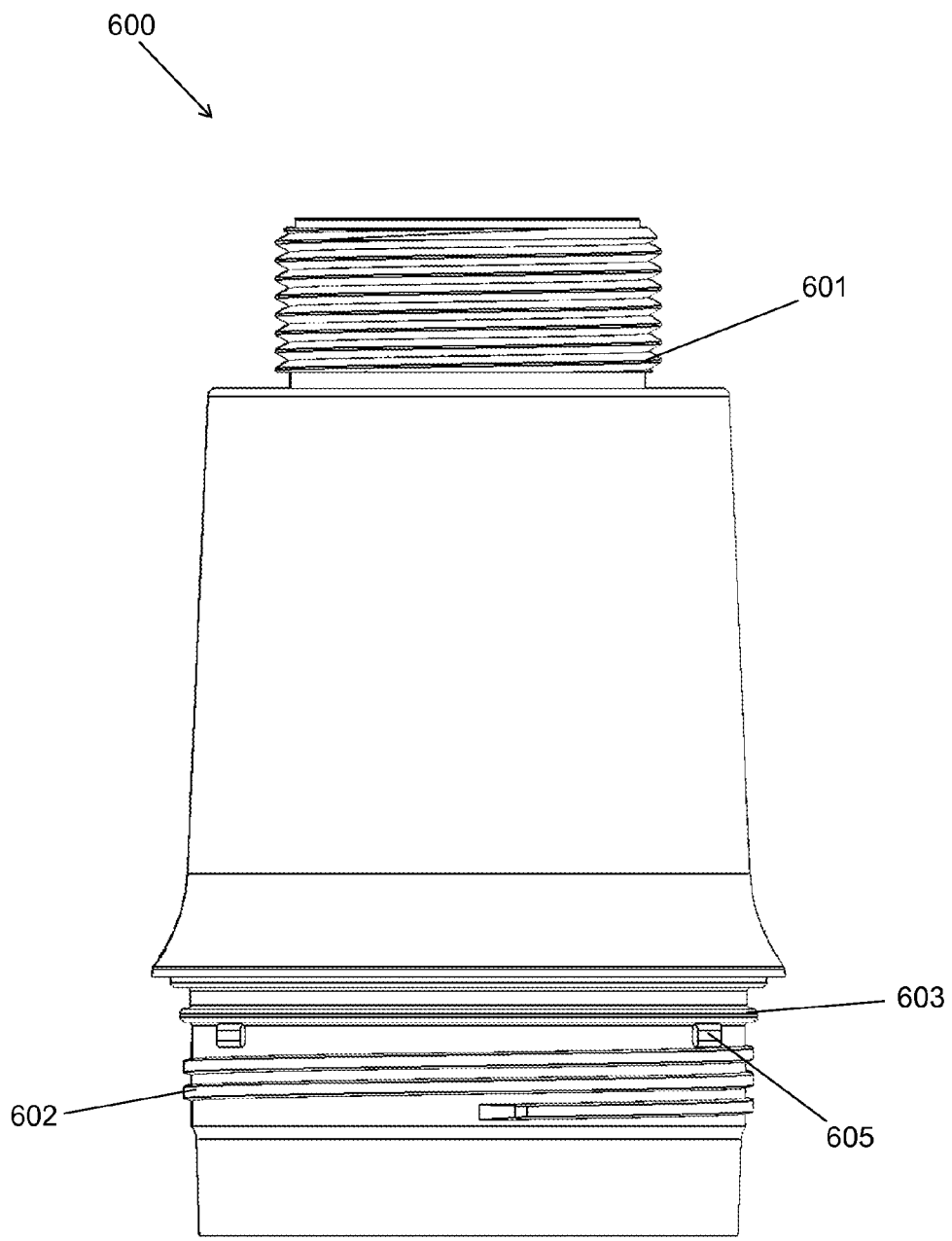

Referring now to FIGS. 6A and 6B, there are shown perspective and front views of the substantially cylindrical casing 600 in isolation without the adapter and dome structure. The substantially cylindrical casing 600 may generally be comprised of a top end portion 601 and a bottom end portion 602. The top end portion 601, extending upwardly, may be removeably mounted directly to a tube (not pictured) or indirectly through an adapter 500 (shown in more detail in FIGS. 5A, 5B and 5C) without a tool. The top end portion 601 generally may be threaded. The bottom end portion 602, extending downwardly, may be removeably mounted to a dome structure 700 (shown in more detail in FIGS. 7A, 7B and 7C) without a tool. The bottom end portion 602 generally may be threaded. The walls of the bottom end portion 602 may form at least one hole 605. The at least one hole 605 may be configured to accept an outer hook 803 from a detachable sliding member 800 (shown in more detail in FIG. 8). The bottom end portion 602 may also be comprised of a waterproof seal 603, made of foam or other suitable materials. The waterproof seal 603 generally may be circular in shape and positioned around the bottom end portion 602. The waterproof seal 603 may also be detachable from the bottom end portion 602. A waterproof foam ring 604, which may also be made of other materials, may be positioned between the top end portion 601 and the adapter 500 when coupled together. The waterproof foam ring 604 may generally be circular in shape.

Figure 7A:
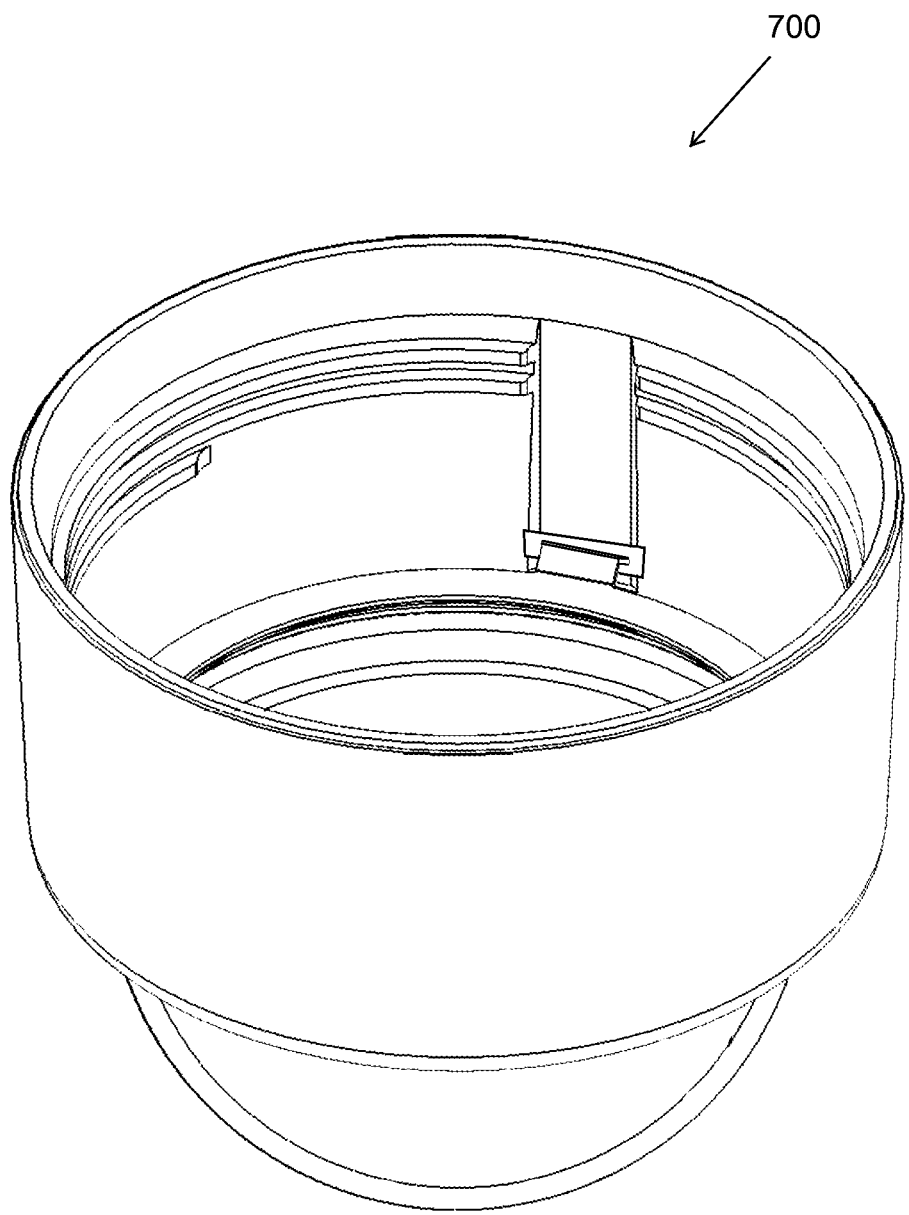
FIG. 7A shows a perspective view of a dome structure comprising a cylindrical dome housing and a substantially clear dome.
Figure 7B:
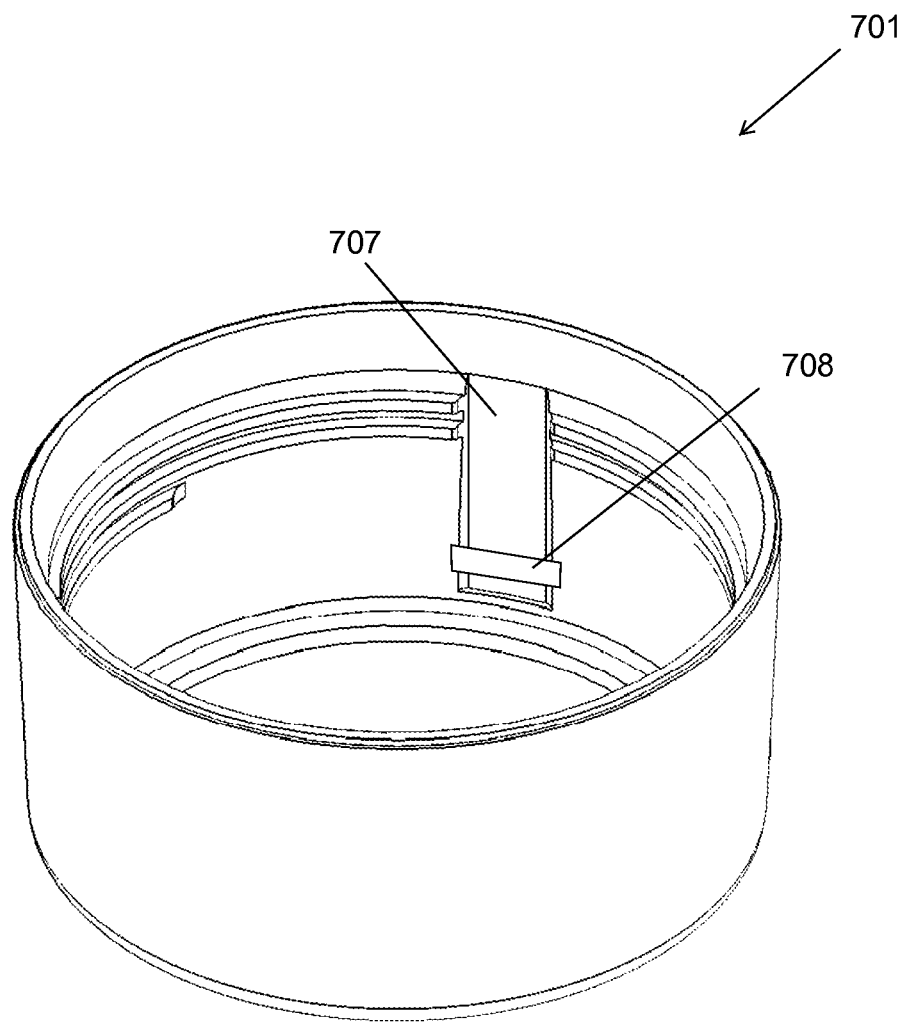
FIGS. 7B and 7C show perspective views, respectively, of a cylindrical dome housing and a substantially clear dome.
Figure 7C:
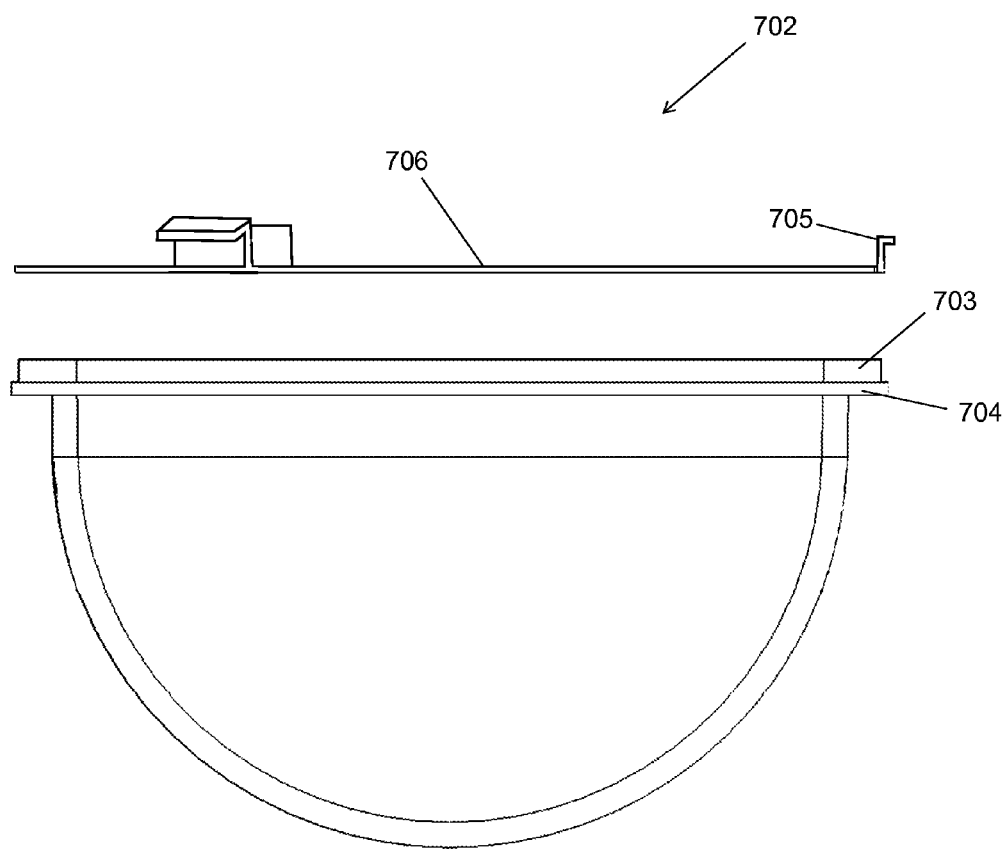

Referring now to FIGS. 7A, 7B and 7C, there are respectively shown perspective views of a dome structure 700, a cylindrical dome housing 701, and a substantially clear dome 702 in isolation. In FIG. 7A, there is shown the perspective view of the dome structure 700 that may be comprised of the cylindrical dome housing 701 and the substantially clear dome 702 affixed together. The dome structure 700 and the bottom end portion 602 of the casing 600 (shown in FIG. 6) may be threaded together without a tool. The dome structure 700 and the bottom end portion 602 of the casing 600 may be threaded together simply by twisting and turning the dome structure 700 in a certain direction onto the bottom end portion 602 of the casing 600. In FIG. 7B, there is shown a perspective view of the cylindrical dome housing 701 in isolation. The inside walls of the cylindrical dome housing 701 may be threaded and include one or more spring slots 707 with detents 708 formed at the bottom of each spring slot 707, as further described below, formed in the inside walls where there is no threading. In FIG. 7C, there is shown a perspective view of the substantially clear dome 702 in isolation.

The substantially clear dome 702 may further generally be comprised of a dome ring 703, a compressible seal 704, and at least one spring 705. The compressible seal 704 may be positioned between the retaining ring 706 and the substantially clear dome 702 when affixed together. The retaining ring 706 may be positioned over the seal 704, which is positioned over the dome ring 703. The one or more springs 705 are arranged around the outside of the retaining ring 706 and stick up and away from the retaining ring 706. The combination of the dome 702, dome ring 703, seal 704, springs 705 and retaining ring 706 may then be inserted into the dome housing 701 by matching the springs 705 up with the spring slots 707 and pushing the retaining ring 706 down until the springs lock in place within detents 708 formed at the bottom of each spring slot 707. The combination of the detents, which are large enough to allow the spring to move up and down, and the at least one spring 705 may function as a shock absorber when the substantially clear dome 702 experiences outside pressure. For example, the entire dome structure 700 may be dropped vertically from a distance above the ground and the substantially clear dome 702 may experience pressure when dropped on the floor such that the at least one spring 705 while in the clipped position between the cylindrical dome housing 701 and the substantially clear dome 702 may absorb the pressure by moving within the detent. The at least one spring 705 may also help prevent the cylindrical dome housing 701 and the substantially clear dome 702 from detaching from one another.

Figure 8:
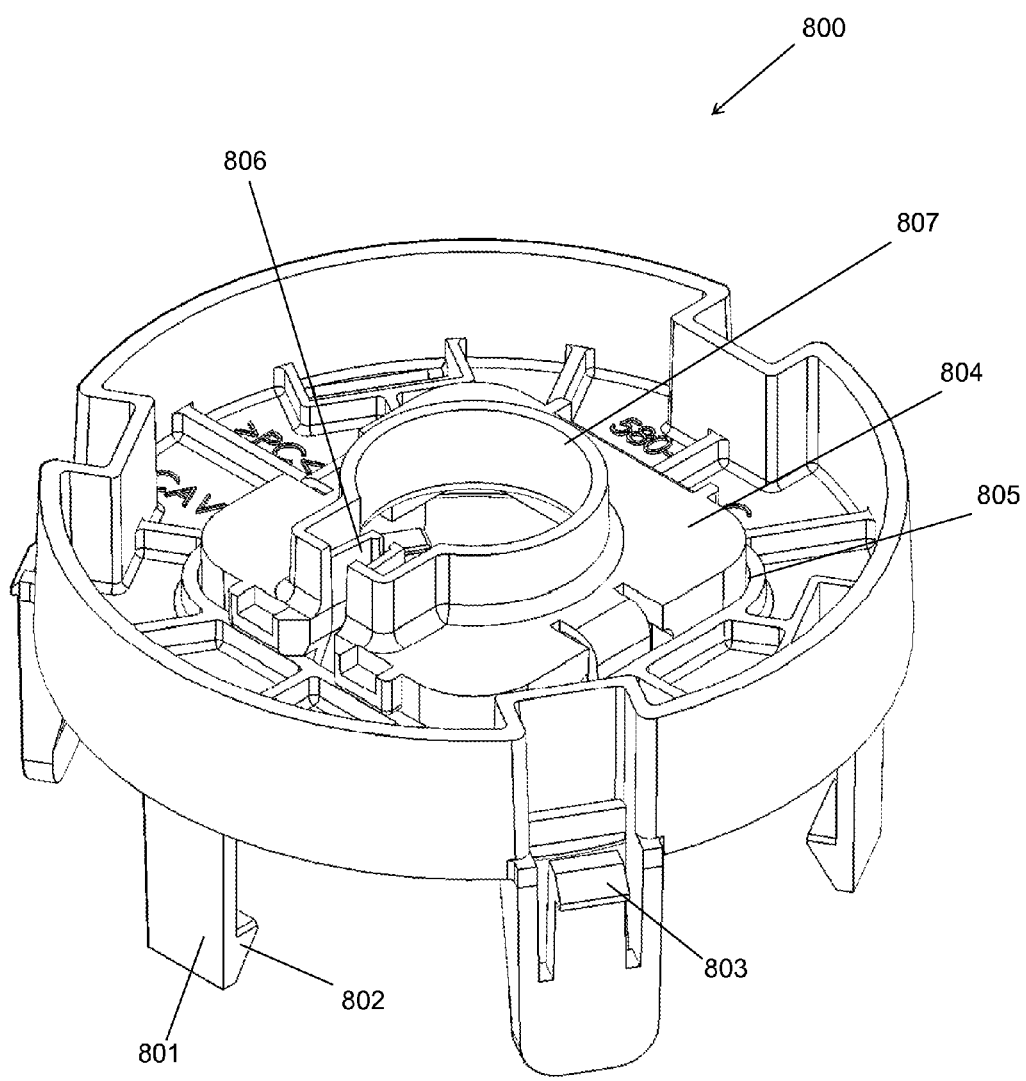
FIG. 8 shows a perspective view of a detachable sliding member.

Referring to FIG. 8, there is shown a perspective view of a detachable sliding member 800. The detachable sliding member may be capable of sliding along an interior wall of the bottom end portion 602 (shown in FIG. 6). The detachable sliding member 800 may be comprised of latches 801. The latches 801 may be comprised of at least one outer hook 803 extending outwardly. The at least one outer hook 803 may be capable of sliding into the hole 605 of the interior of the bottom end portion 602 (shown in FIG. 6) such that the detachable sliding member 800 and the bottom end portion 602 may be removably coupled together. Further, the latches 801 may also be comprised to include at least one inner hook 802 extending inwardly. The at least one inner hook 802 may be capable of providing a removable connection to a gimbal 900 (shown in more detail in FIG. 9). The detachable sliding member 800 and the gimbal 900 may be affixed together by way of the at least one inner hook 802. The detachable sliding member 800 may further include a removable cord protector 804 that clips into an outer opening 805 formed in the middle of the detachable sliding member 800. The outer opening 805 may be large enough to accommodate the image processing module 1002 for the camera 1000 (both shown in FIG. 10) being inserted through detachable sliding member 800. The cord protector 804 may further include a cord opening 806 so the cord protector may be installed around the cable 1003 (shown in FIG. 10). The cord protector 804 may further include an inner opening 807 within which the cable 1003 may freely move, rotate and twist without getting caught or snagged by the latches 801 of the detachable sliding member 800.

Figure 9A:
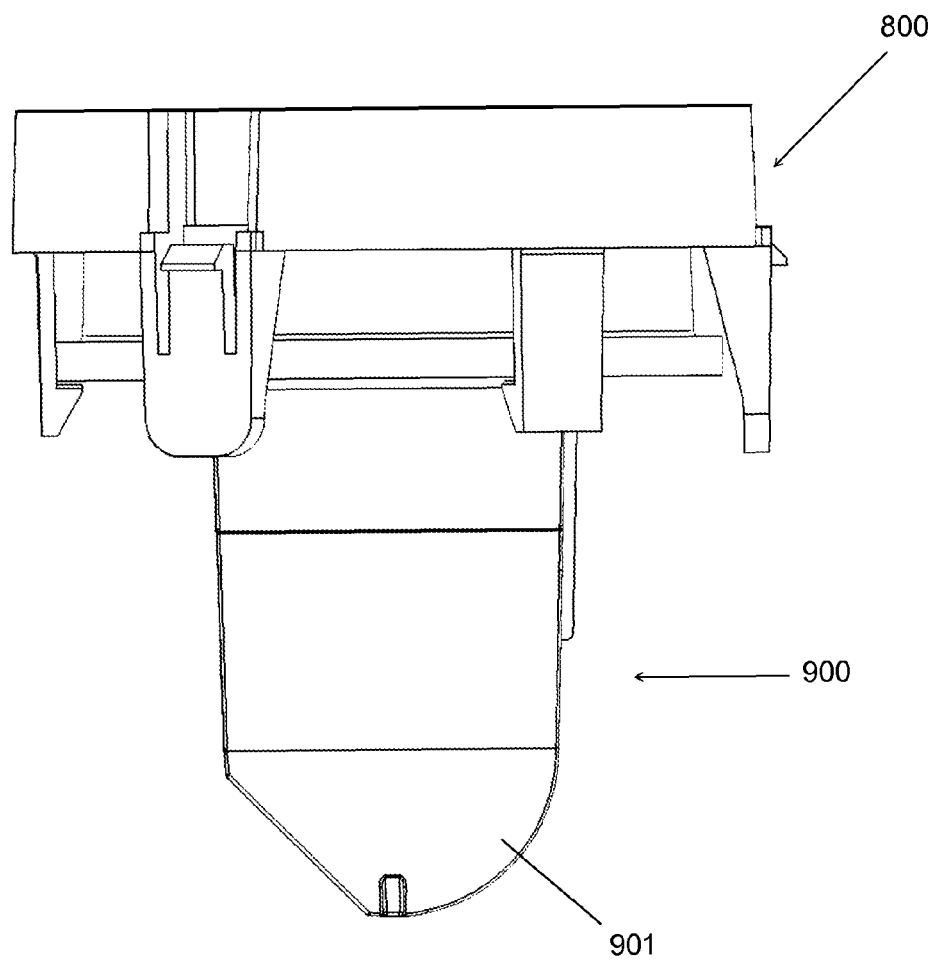
FIGS. 9A and 9B show side views, separated by 90 degrees, respectively, of a gimbal attached to the detachable sliding member.
Figure 9B:
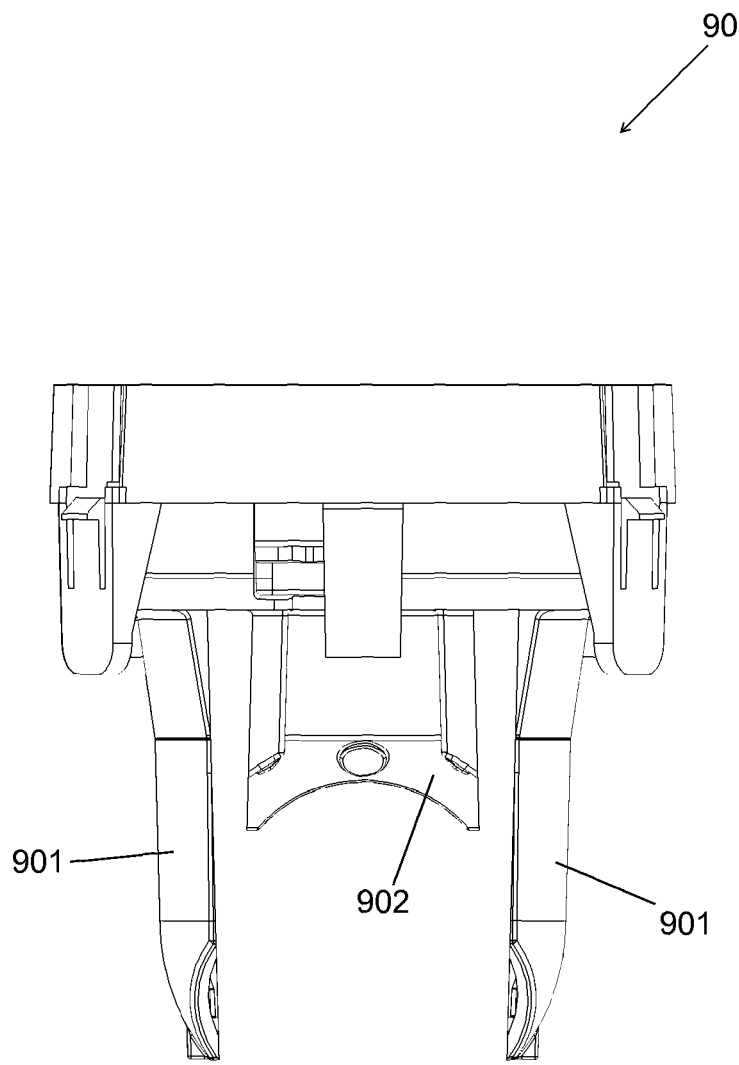
Figure 9C:
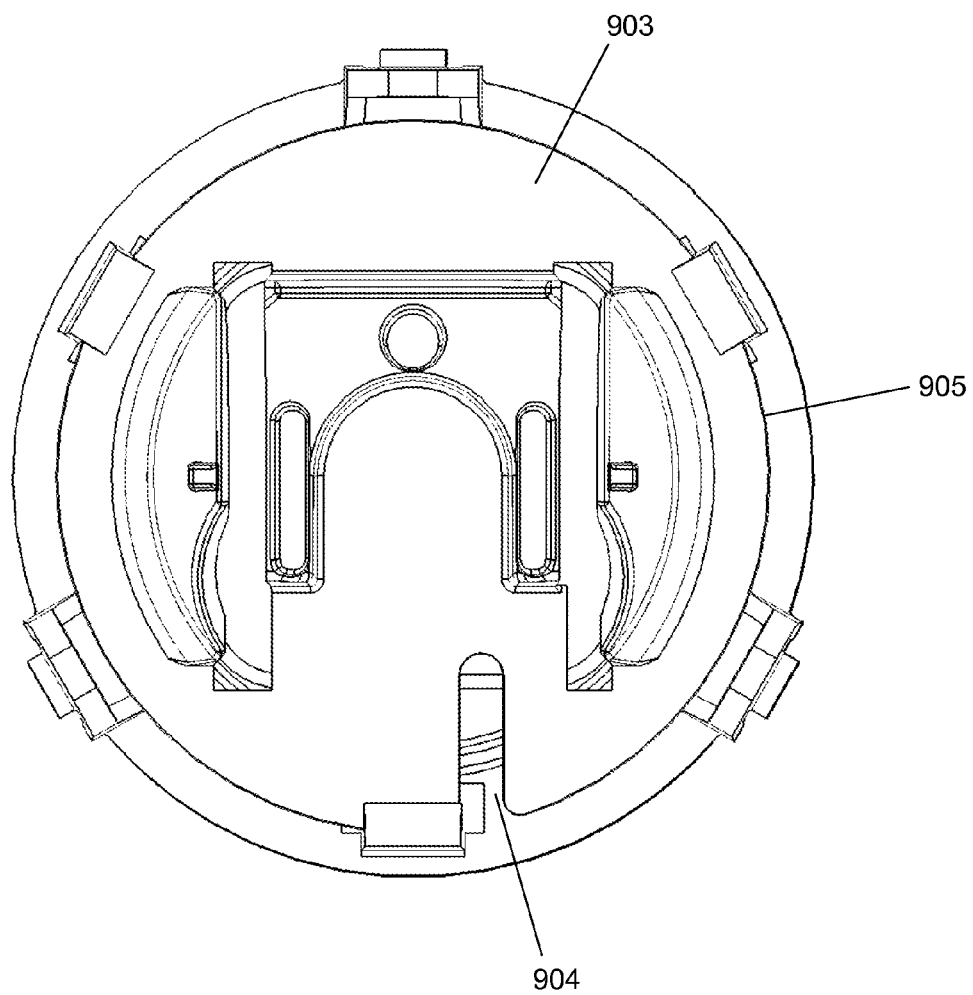
FIG. 9C shows a bottom plan view of the gimbal of FIGS. 9A and 9B.

Referring to FIGS. 9A and 9B, there are shown side views, separated by 90 degrees, respectively, of a gimbal 900 attached to the detachable sliding member 800 of FIG. 8. FIG. 9C shows a bottom plan view of the gimbal of FIGS. 9A and 9B. The gimbal 900 may include a security camera head 1001 (shown in more detail in FIG. 10). The gimbal 900 may also include at least two arms 901 (one of which is shown in FIG. 9A) that are positioned to frictionally retain the security camera head 1001. Each of the arms 901 may be configured to have a linearly positioned side located and positioned to be in contact with the security camera head 1001. As shown in FIG. 9B, the gimbal 900 may include a seat 902 for the camera head 1001. The seat 902 may be curved. In FIG. 9C, there is shown the top plan view of the gimbal 900. The gimbal 900 may include a top surface 903 including a slot 904 that may be configured to receive the cable 1003 that connects the security camera head 1001 and an image processing module 1002. The gimbal 900 may also include a lip 905 extending from the top surface 903 and opposite from where the arms 901 are located. The lip 905 may also be further spaced and configured to create a flange between the lip 905 and a periphery of the top surface 903.

Figure 10:
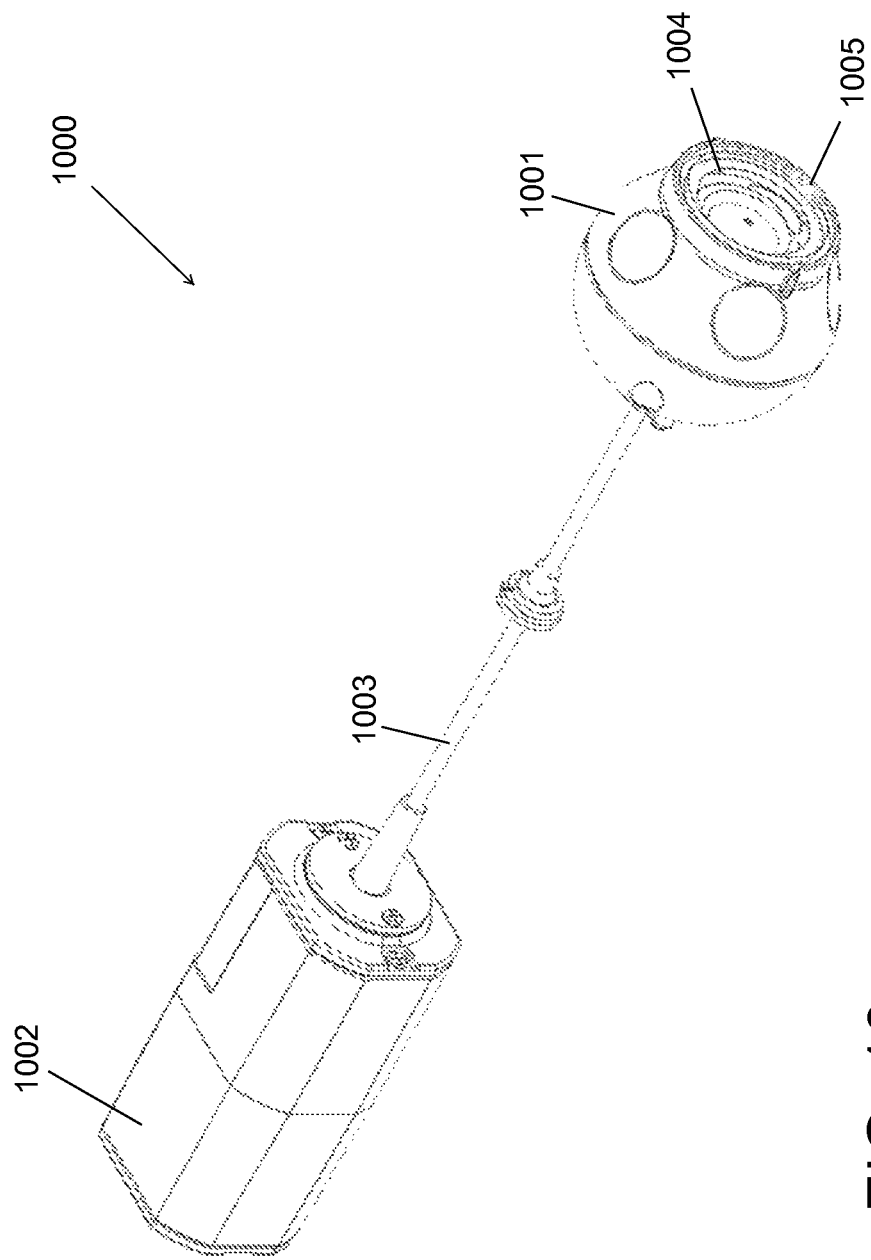
FIG. 10 shows a perspective view of a security camera comprising a cable and an image processing circuitry.

Referring now to FIG. 10, a perspective view of a security camera 1000 is shown. The security camera 1000 may be comprised of a security camera head 1001, an image processing module 1002, and a cable 1003 to connect the security camera 1001 to the image processing module 1002. The security camera head 1001 may be comprised of at least one lens 1004 and one sensor 1005 and include a number indents around the head so it may be gripped and moved with a user's fingers. The image processing module 1002 may be comprised of an image processing circuitry and power circuitry. An example of the camera 1000 is that used in the Avigilon™ HD Micro Dome Camera products manufactured and sold by Avigilon Corporation of Vancouver, British Columbia, Canada, although in alternative embodiments (not depicted) different types of cameras, including non-miniaturized cameras, non-dome cameras, and non-spherical cameras may be placed in the housing 100.

Referring now to FIGS. 11A and 11B, there are shown perspective views of embodiments for mounting the casing 100. FIG. 11A shows a perspective view of the casing 100 mounted to a pendent arm. The pendant arm may have a first end configured to be mounted or affixed to a wall or other vertical surface and a second end configured to be mounted or affixed to the substantially cylindrical casing. FIG. 11B shows a perspective view of the casing 100 mounted to a tube through the adapter 500. The tube may further be suspended down from the ceiling.

While one or more example embodiments have been depicted, additional alternative embodiments (not depicted) are possible. For example, the top end portion 601 mounting to a tube through the adapter 500 may also, in alternative embodiments, mount to a pipe, metal rod, or any other cylindrical shaped tubing. Similarly, in alternative embodiments the casing 100 may be modified to hold a camera that differs from the camera 1000 of FIG. 10. For example an alternative camera may integrate all circuitry into a single housing, as opposed to splitting it in the camera head 1001 and processing module 1002 as is done in the camera 1000. When modified for a camera with all circuitry within a single housing, the cable 1003 connecting the camera head 1001 and the processing module 1002 may be eliminated. As another example of an alternative type of camera, a camera that is non-spherical in shape, including a camera that has a non-spherical camera head, may be used.

In other alternative embodiments, for springs 705, other springs may be used; for example, a coil or torsional spring may be used in place of the described springs.

As mentioned above, while the depicted embodiment of the casing 100 is used to hold the spherical camera 1000 to the tube, in alternative embodiments (not depicted) the casing 100 may be used to hold a camera (including a non-spherical camera) to any suitable planar surface behind which is sufficient volume to accommodate the adapter 500 of the casing 100 and any associated wiring.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed:

1. A housing for a camera, the housing comprising:
   a substantially cylindrical casing, including a top end portion for removeably mounting the substantially cylindrical casing without a tool to a support, a central portion having a diameter that increases from near a top of the central portion to near a bottom of the central portion such that there exists a wider flange near the bottom of the central portion, and a bottom end portion having an exterior side wall extending below the wider flange;
   a dome structure, including a substantially cylindrical dome housing, for housing at least a lens portion of a camera and removeably mounting the dome structure without a tool to the exterior side wall of the bottom end portion; and
   a waterproofing seal positioned at a transition between the central portion and the bottom end portion and configured to create a seal between the substantially cylindrical casing and the dome structure.

2. The housing of claim 1, wherein the bottom end portion further includes an interior side wall forming at least one hole configured to couple with a detachable sliding member for holding the camera and the detachable sliding member is further capable of axially sliding along the interior side wall of the bottom end portion to couple with the bottom end portion.

3. The housing of claim 1, wherein the support is at least one of a threaded tube, a threaded pipe, and a threaded metal rod, and wherein an exterior side wall of the top end portion is threaded to mate with one of the threaded tube, the threaded pipe or the threaded metal rod.

4. The housing of claim 1, wherein the support includes an arm having a first end configured to be mounted to a vertical surface and a second end configured to be mounted to the substantially cylindrical casing.

5. The housing of claim 1, wherein:
   the exterior side wall of the top end portion extends upward and is threaded;
   the exterior side wall of the bottom end portion extends downward and is threaded, wherein the exterior side wall of the bottom end portion further includes a diameter that decreases from near an uppermost part of the bottom end portion to near a lowermost part of the exterior side wall of the bottom end portion such that the exterior side wall of the bottom end portion tapers near the lowermost part of the bottom end portion; and
   the substantially cylindrical dome housing of the dome structure is threaded.

6. The housing of claim 1, wherein the bottom end portion of the substantially cylindrical casing is configured to be threaded together with the dome structure without a tool and to compress the waterproofing seal.

7. The housing of claim 1, wherein the bottom end portion of the substantially cylindrical casing is configured to be threaded together with the dome structure via twisting and/or turning the dome structure in a direction such that the dome structure is fixed to the bottom end portion and to compress the waterproofing seal.

8. The housing of claim 1, wherein the substantially cylindrical dome housing includes a diameter that decreases from near a top of the substantially cylindrical dome housing to near a bottom of the substantially cylindrical dome housing such that the substantially cylindrical dome housing tapers near the bottom of the substantially cylindrical dome housing.

9. The housing of claim 1, further comprising:
   an adapter for removeably mounting to the top end portion, wherein the adapter is threaded and further includes a diameter that increases from near a top of the adapter to near a bottom of the adapter such that there exists a wider circumference near the bottom of the adapter; and
   a waterproofing ring positioned between the top end portion and the adapter.

10. The housing of claim 1, wherein the dome structure further includes:
    a substantially clear dome;
    a dome ring attached to the substantially clear dome;
    a compressible seal positioned between the dome ring and the substantially clear dome;
    a retaining ring for affixing the substantially clear dome and dome ring to the substantially cylindrical dome housing without a tool, wherein the substantially clear dome, the dome ring and the substantially cylindrical dome housing are detachable.

11. The housing of claim 10, wherein the bottom portion of the substantially cylindrical casing includes a set of threads, wherein the retaining ring includes at least one spring, wherein the substantially cylindrical dome housing includes an interior wall having at least one slot formed in the interior wall corresponding to each at least one spring and a set of threads formed between each of the at least one slot for mating with the bottom end portion of the substantially cylindrical casing, wherein each of the at least one slot includes a detent formed in the interior wall near a bottom of the at least one slot, wherein, the retaining ring is mated with the substantially cylindrical dome housing by aligning the at least one spring with the corresponding at least one slot and sliding the retaining ring down into the substantially cylindrical dome housing along the at least one slot until the at least one spring engages the detent.

12. The housing of claim 11, wherein the retaining ring is fit over the dome ring prior to being mated with the substantially cylindrical dome housing, wherein each detent is formed sufficiently large enough to allow the at least one spring to move within the detent while maintaining affixation between the retaining ring and the substantially cylindrical dome housing, and wherein the transition between the central portion and the bottom end portion bottom portion of the substantially cylindrical casing applies pressure on the retaining ring thereby causing the compressible seal between the dome ring and the substantially clear dome to compress and to enable the substantially clear dome to absorb external pressure against the substantially clear dome.

13. The housing of claim 12, wherein the interior wall of the substantially cylindrical dome housing includes a tapered portion that fits over the waterproofing seal positioned at the transition between the central portion and the bottom end portion.

14. A method for housing a camera, the method comprising:
- mounting a substantially cylindrical casing to a support, the substantially cylindrical casing including a top end portion configured to mount the substantially cylindrical casing to the support, a central portion having a diameter that increases from near a top of the central portion to near a bottom of the central portion such that there exists a wider flange near the bottom of the central portion, and a bottom end portion having an exterior side wall extending below the wider flange;
- connecting an image processing module of a camera to a cable within the support; and
- mounting without a tool a dome structure, including a substantially cylindrical dome housing, for housing at least a lens portion of the camera, to the exterior side wall of the bottom end portion so as to compress a waterproofing seal positioned at a transition between the central portion and the bottom end portion of the substantially cylindrical casing.

15. The method of claim 14, wherein:
- the top end portion includes an exterior side wall that extends upward and is threaded;
- the bottom end portion includes an exterior side wall that extends downward and is threaded, wherein the exterior side wall of the bottom end portion further includes a diameter that decreases from near an uppermost part of the bottom end portion to near a lowermost part of the bottom end portion such that the exterior side wall of the bottom end portions tapers near the lowermost part of the bottom end portion; and
- the substantially cylindrical dome housing is threaded.

16. The method of claim 15, further comprising:
- placing a waterproofing ring over exterior side wall of the top end portion; and
- mounting an adapter over the top end portion until it compresses the waterproofing ring before mounting the substantially cylindrical casing to the support, herein the adapter is threaded, wherein the adapter is configured to adapt the top end portion to mount to an exterior threaded support instead of an interior threaded support, and wherein the adapter further includes a diameter that increases from near the top of the adapter to near the bottom of the adapter such that there exists a wider circumference near the bottom of the adapter.

17. The method of claim 14, wherein the dome structure further includes:
- a substantially clear dome;
- a dome ring attached to the substantially clear dome;
- a compressible seal positioned between the dome ring and the substantially clear dome; and
- a retaining ring for affixing the substantially clear dome and dome ring to the substantially cylindrical dome housing without a tool, wherein the substantially clear dome, the dome ring and the substantially cylindrical dome housing are detachable.

18. The method of claim 17, wherein the bottom portion of the substantially cylindrical casing includes a set of threads, wherein the retaining ring includes at least one spring, wherein the substantially cylindrical dome housing includes an interior wall having at least one slot formed in the interior wall corresponding to each at least one spring and a set of threads formed between each of the at least one slot for mating with the bottom end portion of the substantially cylindrical casing, wherein each of the at least one slot includes a detent formed in the interior wall near a bottom of the at least one slot, wherein the method further comprises:
- mating the retaining ring with the substantially cylindrical dome housing by aligning the at least one spring with the corresponding at least one slot and sliding the retaining ring down into the substantially cylindrical dome housing along the at least one slot until the at least one spring engages the detent.

19. The method of claim 18, further comprising:
- fitting the retaining ring over the dome ring prior to mating the retaining ring with the substantially cylindrical dome housing, wherein each detent is formed sufficiently large enough to allow the at least one spring to move within the detent while maintaining affixation between the retaining ring and the substantially cylindrical dome housing, and wherein the transition between the central portion and the bottom end portion bottom portion of the substantially cylindrical casing applies pressure on the retaining ring thereby causing the compressible seal between the dome ring and the substantially clear dome to compress and to enable the substantially clear dome to absorb external pressure against the substantially clear dome.

\* \* \* \* \*